(12) United States Patent
Okada

(10) Patent No.: US 7,040,606 B2
(45) Date of Patent: May 9, 2006

(54) HUMIDIFIER

(75) Inventor: Keiji Okada, Fujisawa (JP)

(73) Assignee: Nok Corporation, Tokoyo (JP)

(*) Notice: Subject to any disclaimer, the term of this patent is extended or adjusted under 35 U.S.C. 154(b) by 207 days.

(21) Appl. No.: 10/415,344

(22) PCT Filed: Nov. 16, 2001

(86) PCT No.: PCT/JP01/09702

§ 371 (c)(1),
(2), (4) Date: Oct. 10, 2003

(87) PCT Pub. No.: WO02/37033

PCT Pub. Date: May 10, 2002

(65) Prior Publication Data

US 2005/0121812 A1    Jun. 9, 2005

(30) Foreign Application Priority Data

Nov. 6, 2000   (JP) ............................. 2000-338025

(51) Int. Cl.
*B01F 3/04*   (2006.01)

(52) U.S. Cl. ................................ 261/23.1; 261/104
(58) Field of Classification Search .............. 261/23.1, 261/102, 104, 105; 128/203.12, 204.13
See application file for complete search history.

(56) References Cited

U.S. PATENT DOCUMENTS

| | | | | |
|---|---|---|---|---|
| 4,007,601 A | * | 2/1977 | Webbon | 62/100 |
| 4,146,597 A | * | 3/1979 | Eckstein et al. | 261/104 |
| 4,220,535 A | * | 9/1980 | Leonard | 210/321.89 |
| 4,666,469 A | * | 5/1987 | Krueger et al. | 95/54 |
| 5,149,340 A | * | 9/1992 | Waycuilis | 95/49 |
| 5,525,143 A | * | 6/1996 | Morgan et al. | 95/52 |
| 6,210,464 B1 | * | 4/2001 | Nakanishi et al. | 95/52 |
| 6,394,084 B1 | * | 5/2002 | Nitta | 128/201.13 |

FOREIGN PATENT DOCUMENTS

| | | |
|---|---|---|
| JP | 61-17026 | 1/1986 |
| JP | 62-130321 | 8/1987 |
| JP | 07-071795 | 3/1995 |
| JP | 08-273687 | 10/1996 |
| JP | 10-172592 | 6/1998 |

* cited by examiner

*Primary Examiner*—Scott Bushey
(74) *Attorney, Agent, or Firm*—Jacobson Holman PLLC

(57) ABSTRACT

A humidifier including an inner case of the shape of a cylinder having a bottom, an outer case of cylindrical shape arranged to be concentric with the inner case, and a plurality of hollow fiber membranes being placed in the space between the two cases and formed into a hollow fiber membrane bundle of a cylindrical shape, wherein fluid pathways are provided which connect from the interior part to the exterior part of the hollow fiber membrane bundle. The humidifier allows all of the hollow fiber membranes to take part in humidification effectively, and thus exhibits improved efficiency in humidification.

2 Claims, 3 Drawing Sheets

HUMIDIFIER

This is a nationalization of PCT/JP01/09702, filed Nov. 6, 2001 and published in Japanese.

TECHNICAL FIELD

This invention relates to a humidifier for humidifying gas supplied to e.g., a fuel cell.

BACKGROUND ART

In a polymer electrolyte fuel cell, a device for humidifying and supplying a fuel gas such as hydrogen, etc., and an oxidizer gas such as oxygen, etc. (hereinafter both are called a reaction gas) is required.

For example, a device utilizing a hollow fiber membrane as disclosed in JP-A-8-273687 is known as such a humidifier.

The humidifier in the conventional art will be explained by reference to FIG. 5. FIG. 5 is a schematically sectional view of the humidifier in the conventional art.

As shown in this figure, the humidifier 100 in the conventional art consists schematically of a case 101 and a hollow fiber membrane bundle 102 filled within this case 101.

The case 101 is approximately formed in a cylindrical shape, and has an opening portion 101a at one end of the cylinder and an opening portion 101b at the other end. Further, the case 101 has opening portions 101c, 101d on its sidewall.

And, the hollow fiber membrane bundle 102 is filled within this case 101. One end of the hollow fiber membrane bundle 102 is sealed between the outer wall faces of the hollow fiber membranes and between the outer wall faces of the hollow fiber membranes and the inner wall face of the case 101 so as to open only the hollow interior in the opening portion 101a. The other end of the hollow fiber membrane bundle 102 is similarly sealed between the outer wall faces of the hollow fiber membranes and between the outer wall faces of the hollow fiber membranes and the inner wall face of the case 101 so as to open only the hollow interior in the opening portion 101b.

Also, a clearance 103 is arranged on the side face side of the hollow fiber membrane bundle 102 between the hollow fiber membrane bundle 102 and the case 101.

Thus, a first path entering the hollow interior of the hollow fiber membrane of the hollow fiber membrane bundle 102 from the opening portion 101a side (arrow S0), and reaching the other end side of the hollow fiber membrane bundle 102 through the hollow interior (arrow S1) is arranged. Further, a second path entering the interior of the case 101 from the opening portion 101d (arrow T0), and reaching the exterior of the case 101 from the opening portion 101c through the clearance 103 is arranged.

Thus, for example, the reaction gas is flowed to the first path and water is flowed to the second path so that the reaction gas within the first path is humidified by transmitting the water within the second path through the membrane of the hollow fiber membrane and diffusing this water into the first path.

Since the humidifier is constructed so as to perform a humidifying action by utilizing that water is transmitted through the membrane of the hollow fiber membrane in this way, the humidifying action is accelerated as the area of the flowing water coming in contact with the hollow fiber membrane is increased.

However, in the above conventional art, since the construction for setting plural hollow fiber membranes to a columnar bundle and flowing water onto its outer circumferential wall face is used, the water is flowed onto the outer circumferential surface of the bundle along the axial line. Thus, there are defects in that no water is sufficiently permeated to the interior of the bundle, and no hollow fiber membrane near the center of the bundle effectively functions, and humidifying efficiency is low.

An object of the present invention is to provide a humidifier for improving the humidifying efficiency.

DISCLOSURE INVENTION

To achieve the above object, the present invention resides in a humidifier characterized in that the humidifier comprises:

a sleeve-shaped inner case having a bottom;

a sleeve-shaped outer case concentrically arranged with respect to the inner case; and a hollow fiber membrane bundle filled in an annular clearance between the outer case and the inner case;

wherein the humidifier further comprises:

a first path from one end side of said hollow fiber membrane bundle to the other end side through the hollow interior of each hollow fiber membrane; and a second path from a first opening portion arranged on the sidewall of said inner case to a second opening portion arranged on the sidewall of said outer case through between the outer wall faces of the respective hollow fiber membranes within the hollow fiber membrane bundle; and a humidifying object gas is flowed to one of said first and second paths, and a fluid including moisture is flowed to the other.

Here, the upstream side of the first path may be set to one end side of the hollow fiber membrane bundle, and may be also set to the other end side. Further, the upstream side of the second path may be set to the first opening portion arranged on the sidewall of the inner case, and may be also set to the second opening portion arranged on the sidewall of the outer case.

Accordingly, since the second path is arranged so as to reach the outer wall side from the inner wall side of the annular clearance, this path is extended from the inside diameter side of the hollow fiber membrane bundle filled in the annular clearance to the outside diameter side.

It is preferable that said first opening portion is arranged near one end of the hollow fiber membrane bundle, and said second opening portion is arranged near the other end of the hollow fiber membrane bundle.

Thus, the second path is extended from one end side of the hollow fiber membrane bundle to the other end side.

It is also preferable that a plurality of said first opening portions are arranged in different positions with respect to the axial direction, and the opening diameters of these opening portions are set to gradually reduce toward the bottom of the inner case.

Thus, when the fluid is flowed toward the bottom within the sleeve of the inner case, the fluid can be flowed from each opening portion into the hollow fiber membrane bundle with good balance.

It is also preferable that a clearance is formed between the outer circumferential face of said inner case and the inner circumferential face of said hollow fiber membrane bundle.

Thus, when the fluid is flowed from the first opening portion arranged in the inner case to the hollow fiber membrane bundle, the fluid can be equally flowed onto the inner circumferential face of the hollow fiber membrane bundle.

It is also preferable that the gas after the humidification is supplied to a fuel cell.

BEST MODE FOR CARRYING OUT THE INVENTION

The preferred embodiments of this invention will next be explained exemplarily in detail by reference to the drawings. The sizes, materials, shapes, their relative arrangements, etc. of constructional parts described in these embodiments are not intended to limit the scope of this invention only to them unless they are particularly specifically described.

Figure 1:
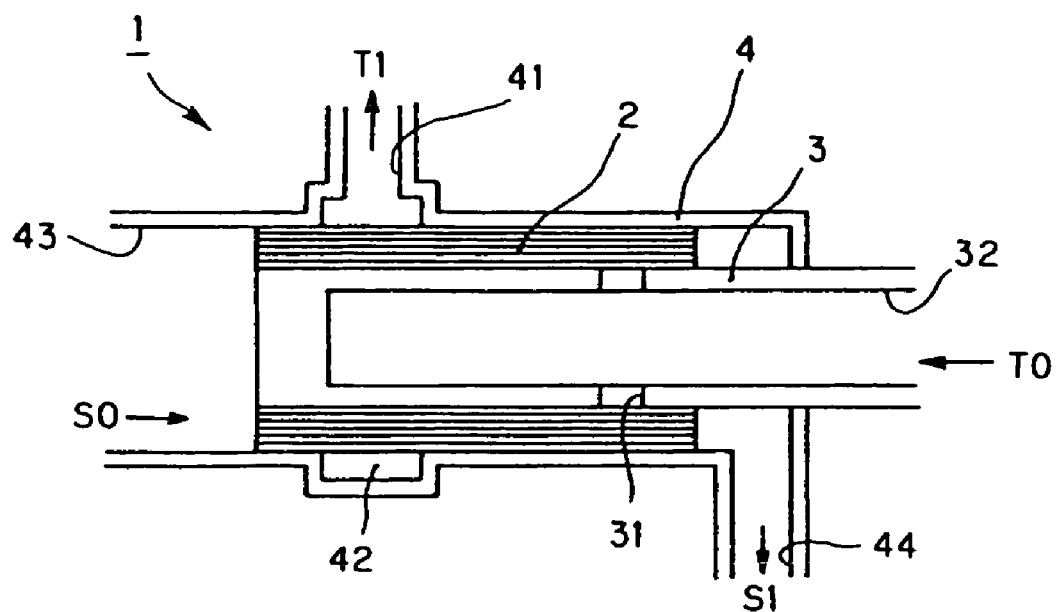
FIG. 1 is a schematically sectional view of a humidifier in accordance with a first embodiment of the present invention.
Figure 2:
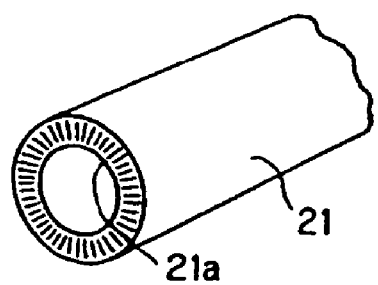
FIG. 2 is a perspective view showing an end portion of a hollow fiber membrane.

A humidifier in accordance with a first embodiment of the present invention will be explained by reference to FIGS. 1 and 2. FIG. 1 is a schematically sectional view of the humidifier in accordance with the first embodiment of the present invention. FIG. 2 is a perspective view showing an end portion of a hollow fiber membrane.

The humidifier 1 in accordance with this embodiment is a device for humidifying a reaction gas (a fuel gas of hydrogen, etc., and an oxidizer gas of oxygen, etc. as mentioned above) of e.g., a polymer electrolyte fuel cell.

And, as shown in these figures, the humidifier 1 is schematically constructed by an inner case 3, an outer case 4 concentrically arranged with respect to this inner case 3, and a hollow fiber membrane bundle 2 filled in an annular clearance between these cases.

The inner case 3 is constructed by a sleeve-shaped member having a bottom, and has an opening portion 32 at one end, and also has an opening portion (first opening portion) 31 on the sidewall. A single opening portion 31 may be arranged and plural opening portions 31 (plural with respect to the circumferential direction or the axial direction) may be also arranged, and they may be provided in accordance with necessity. Humidifying efficiency can be normally raised as plural opening portions are provided.

The outer case 4 is constructed by a sleeve-shaped member, and has opening portions 43, 44 at each end. In the illustrated example, the opening portion 44 is formed on the sidewall so as to perpendicularly bend a path on one end side. An opening portion (second opening portion) 41 is also arranged.

The opening portion 41 is arranged on one portion of the circumference of a portion of the outer case 4 diametrically increased so as to provide a clearance 42 between the side face of the hollow fiber membrane bundle 2 and the outer case 4. This is an arrangement to prevent the flow of a fluid flowing through a second path from being concentrated onto the vicinity of the opening portion 41 by detouring the clearance 42.

And, plural hollow fiber membranes 21 are filled in the annular clearance between the inner case 3 and the outer case 4, and form the hollow fiber membrane bundle 2. This hollow fiber membrane bundle 2 forms a hollow cylindrical structural body.

Here, each hollow fiber membrane 21 is constructed such that only the hollow interior faces the opening portions 43, 44 at both the ends of the outer case 4 and is opened. Namely, in an end portion on the opening portion 43 side, the portion between the outer wall faces of the respective hollow fiber membranes 21, and the portion between these outer wall faces and the inner wall face of the outer case 4 are sealed by a sealant. Further, in an end portion on the opening portion 44 side, the portion between the outer wall faces of the respective hollow fiber membranes 21, the portion between these outer wall faces and the inner wall face of the outer case 4, and the portion between these outer wall faces and the outer wall face of the inner case 3 are sealed by the sealant. Thus, only the hollow interior faces the opening portions and is opened at both the ends of each hollow fiber membrane 21.

The opening portion 31 arranged in the above inner case 3, and the opening portion 41 arranged in the outer case 4 are constructed so as to be located on inner positions (inner in the axial direction) than positions sealed by the sealant.

Thus, a first path entering the hollow interior 21a of the hollow fiber membrane 21 from one end side (opening portion 43 side) of the hollow fiber membrane bundle 2 (arrow S0), and reaching the other end side (opening portion 44 side) of the hollow fiber membrane bundle 2 through the hollow interior 21a (arrow S1) is arranged.

Further, a second path entering the inner case 3 from the opening portion 32 (arrow T0), and entering the clearance between the inner case 3 and the outer case 4 from the opening portion 31, and entering the interior of the hollow fiber membrane bundle 2, and reaching the device exterior from the opening portion 41 arranged in the outer case 4 through between the outer wall faces of the hollow fiber membranes 21 (arrow T1) is arranged.

Routes shown by the arrows of these first and second paths are set to explain the paths, and do not necessarily mean that the fluid (a humidifying object gas and a fluid including moisture) is flowed in the directions shown by these arrows.

In accordance with such a construction, the reaction gas as a humidifying object gas is flowed to one of the first and second paths, and the fluid including moisture is flowed to the other. Here, water, a wet gas (an exhaust gas from cells of a fuel cell can be used), etc. are included in the fluid including moisture.

Thus, when the fluid including moisture flows along the membrane wall face of the hollow fiber membrane, the fluid is moved to a flowing passage of the reaction gas, and the moisture is dispersed into the reaction gas, and the gas is humidified.

This is because, when the gases of different humidities (or moistures) are flowed to the interior and the exterior of the membrane, the moisture flows from the direction of a high water vapor partial pressure to the direction of a low water vapor partial direction in nature, and only the moisture is transmitted through the membrane in nature.

As mentioned above, in this embodiment, the second path is formed so as to extend through the outer wall face side of the hollow fiber membrane bundle 2 forming the hollow cylindrical structural body from the inner wall face of the hollow fiber membrane bundle 2. Therefore, it contributes to the humidifying action from the hollow fiber membrane located on the internal side of the hollow fiber membrane bundle 2 to the hollow fiber membrane located on the external side so that humidifying efficiency can be improved.

Further, as particularly shown in FIG. 1, the distance of the second path with respect to the axial direction can be sufficiently secured by arranging the opening portion 31 on one end side of the hollow fiber membrane bundle 2, and arranging the opening portion 41 on the other end side of the hollow fiber membrane bundle 2 so that the humidifying efficiency can be further improved.

As mentioned above, the humidifying efficiency can be improved by the embodiment of the present invention. Further, it is thus possible to make the device compact in equivalent performance, or reduce the number of used hollow fiber membranes in comparison with the conventional art.

For example, when the hollow fiber membrane bundle is set to have a columnar structure as in the conventional art and the columnar structure is set to 31 mm in outside diameter and 150 mm in length, 1000 hollow fiber membranes are required. In contrast to this, when the hollow fiber membrane bundle is set to have a cylindrical structure as in this embodiment and the cylindrical structure is set to 16 mm in inside diameter, 32 mm in outside diameter and 150 mm in length, it is sufficient to arrange 750 hollow fiber membranes, and humidifying performance can be improved by about 10%.

Here, the humidifying performance is evaluated by a water vapor transmitting amount on a drying gas side when the humidifier is operated at the pressure and the flow rate of water or a wet gas, and the pressure and the flow rate of the drying gas to be humidified.

The cylindrical structure is set to 13 mm in inside diameter, 26 mm in outside diameter and 150 mm in length and 550 hollow fiber membranes are used to satisfy the humidifying performance equivalent to that in the case of the conventional art. Therefore, the device could be made compact by about 33%.

Some more concrete embodiments will next be explained on the basis of the above embodiments.

FIRST EXAMPLE

A polymer material such as polyimide, etc. is used as a raw material of the hollow fiber membrane 21. And, the hollow fiber membrane 21 has 3 mm or less (preferably 0.2 to 1 mm) in outside diameter, and plural very small holes of several nm are formed on its wall face.

For example, 100 to 10000 hollow fiber membranes 21 are bundled and filled in the annular clearance between the inner case 3 and the outer case 4 so that the hollow fiber membrane bundle 2 is formed. As mentioned above, this hollow fiber membrane bundle 2 is formed in a hollow cylindrical shape, and is designed such that its outside diameter is about 1.2 to 3 times the inside diameter and is larger by about 2 to 100 mm than the inside diameter (e.g., the inside diameter is set to 10 to 100 mm, and the outside diameter is set to 12 to 200 mm). The hollow fiber membrane bundle 2 is also set to about 50 to 500 mm in length.

Further, the portion between the outer wall faces of the respective hollow fiber membranes 21, the portion between these outer wall faces and the inner wall face of the outer case 4 and the portion between these outer walls and the outer wall face of the inner case 3 are sealed at both the ends of the hollow fiber membrane bundle 2. Furthermore, an adhesive of epoxy resin, urethane, etc. is used as a sealant for fixing the hollow fiber membrane bundle 2.

A core pipe manufactured by using hard resin such as PC (polycarbonate), PPO (polyphenylene oxide), etc. is used as the inner case 3.

The number of opening portions 31 arranged in this inner case 3 and the position of the opening portion 31 may be suitably designed in accordance with the required humidifying efficiency, etc. as mentioned above. In this example, plural opening portions 31 are arranged at an equal interval near one end side of the hollow fiber membrane bundle 2 with respect to the circumferential direction. In contrast to this, the opening portion 41 is arranged in one place in the outer case 4 near the other end side of the hollow fiber membrane bundle 2.

In accordance with such a construction, as shown in FIG. 1, the reaction gas was flowed to the first path from the arrow S0 to the arrow S1, and water was flowed to the second path from the arrow T0 to the arrow T1.

Thus, the water flowed into the second path flows from the opening portions 31 arranged at the equal interval near one end side of the hollow fiber membrane bundle 2 with respect to the circumferential direction to the opening portion 41 arranged near the other end side of the hollow fiber membrane bundle 2. Therefore, this water flows by a sufficient distance in the axial direction from the interior of the hollow fiber membrane bundle 2 to the exterior.

Accordingly, each of all the filled hollow fiber membranes 21 effectively functions. Since the clearance 42 is formed, the water exuded to this clearance 42 can be easily discharged from the opening portion 41 by detouring the clearance 42. Therefore, no flow is concentrated onto the vicinity of the opening portion 41.

The humidifier excellent in humidifying efficiency could be realized as mentioned above.

SECOND EXAMPLE

In this example, water flowed to the second path is flowed in the direction reverse to that in the case of the first example, i.e., from the opening portion 41 side to the opening portion 32 side via the opening portion 31 by using the humidifier of the same structure as the above first example.

In this case, the humidifier excellent in humidifying efficiency could be similarly realized.

THIRD EXAMPLE

In the above first example, water is shown as the fluid including moisture as a humidifying medium, but a wet gas is used in this example.

Here, since an exhaust gas after generating electricity by fuel cells holds high humidity in a polymer electrolyte fuel cell, this exhaust gas can be utilized as the humidifying medium (wet gas).

In this case, the humidifier excellent in humidifying efficiency could be similarly realized.

FOURTH EXAMPLE

In the above first example, the reaction gas is flowed to the first path, and water is flowed to the second path. However, in this example, water or a wet gas is flowed to the first path, and the reaction gas is flowed to the second path. No flowing direction of each fluid is limited.

In this case, the humidifier excellent humidifying efficiency could be similarly realized.

FIFTH EXAMPLE

A humidifier in accordance with a fifth example of the present invention will be explained by reference to FIG. 3.

In the above first example, the opening portion 31 is arranged only near one end side of the hollow fiber membrane bundle 2. However, this example will be explained when plural opening portions 31 are arranged in different places in the axial direction.

The other constructions and actions are the same as the first embodiment. Accordingly, the same constructional portions are designated by the same reference numerals, and their explanations are omitted.

Figure 3:
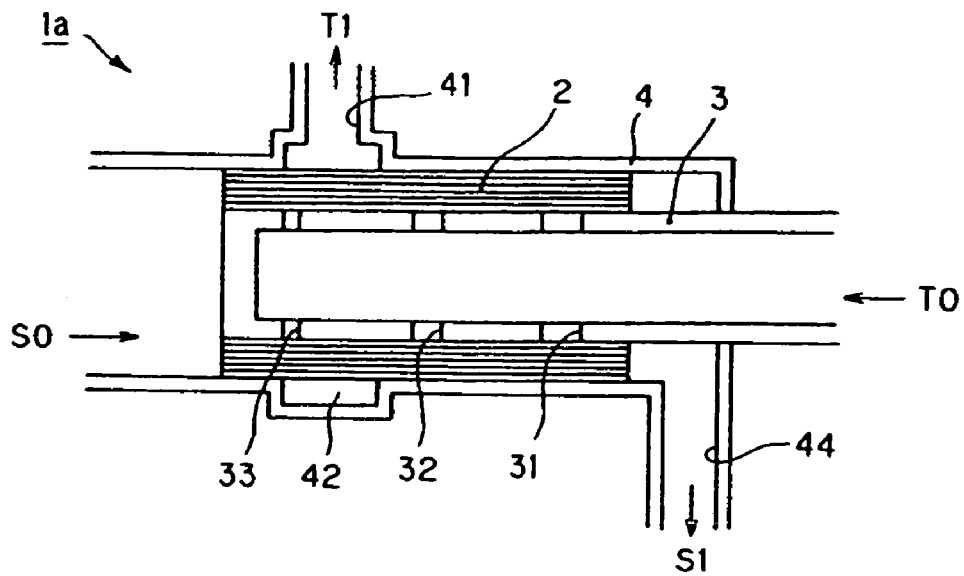
FIG. 3 is a schematically sectional view of a humidifier in accordance with a fifth example of the present invention.

FIG. 3 is a schematically sectional view of the humidifier in accordance with the fifth example of the present invention.

As shown in this figure, in the humidifier 1a in accordance with this example, plural opening portions are further arranged in different positions in the axial direction as the opening portions arranged in the inner case 3 in addition to the opening portion 31 arranged near one end side of the hollow fiber membrane bundle 2. In the illustrated example, opening portions 32, 33 are further arranged in two places.

And, the opening diameters of these opening portions are set so as to gradually reduce toward the bottom of the sleeve-shaped inner case 3 having the bottom.

In accordance with such a construction, when water or the wet gas is flowed to the second path from the arrow T0 to the arrow T1, the flowing-in amount in the flowing-in of the water or the wet gas from each opening portion into the hollow fiber membrane bundle 2 can be adjusted by each opening portion.

Here, when the arranging case of plural opening portions in different positions in the axial direction is considered, flow path resistance within the hollow fiber membrane bundle 2 is reduced as the opening portion is near T1. Accordingly, if plural opening portions of the same size are bored, the flow is concentrated onto the opening portion near T1 so that only one portion of the hollow fiber membrane bundle 2 is effectively utilized.

Therefore, by reducing the opening diameter of the opening portion near the bottom portion, the flow path resistance of this opening portion is increased and the flow rate of this opening portion is limited. Thus, the water or the wet gas is flowed into the hollow fiber membrane bundle 2 with good balance from the opening portion far from T1 so that the entire hollow fiber membrane bundle 2 can be effectively utilized in the humidification.

Thus, humidifying performance can be set to be best by gradually reducing and balancing the opening diameter of the opening portion.

Accordingly, each hollow fiber membrane 21 can be more effectively practically used, and humidifying efficiency can be raised.

SIXTH EXAMPLE

A humidifier in accordance with a sixth example of the present invention will be explained by reference to FIG. 4.

In this example, the arranging case of a clearance 34 between the outer circumferential face of the inner case 3 and the inner circumferential face of the sleeve-shaped hollow fiber membrane bundle 2 will be explained.

The other constructions and actions are the same as the first embodiment. Therefore, the same constructional portions are designated by the same reference numerals, and their explanations are omitted.

Figure 4:
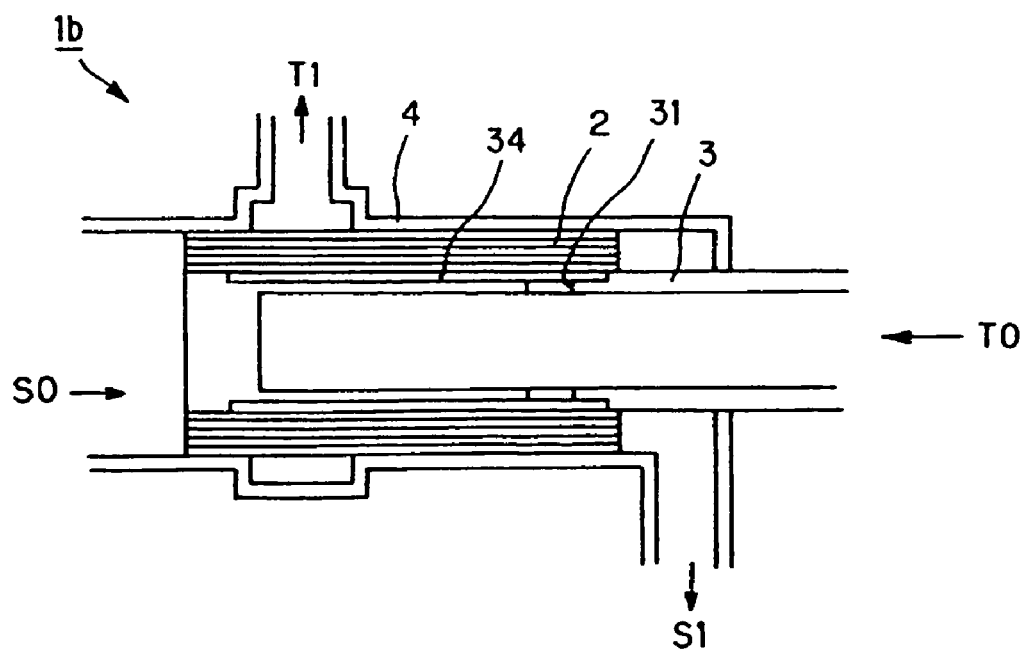
FIG. 4 is a schematically sectional view of a humidifier in accordance with a sixth example of the present invention.
Figure 5:
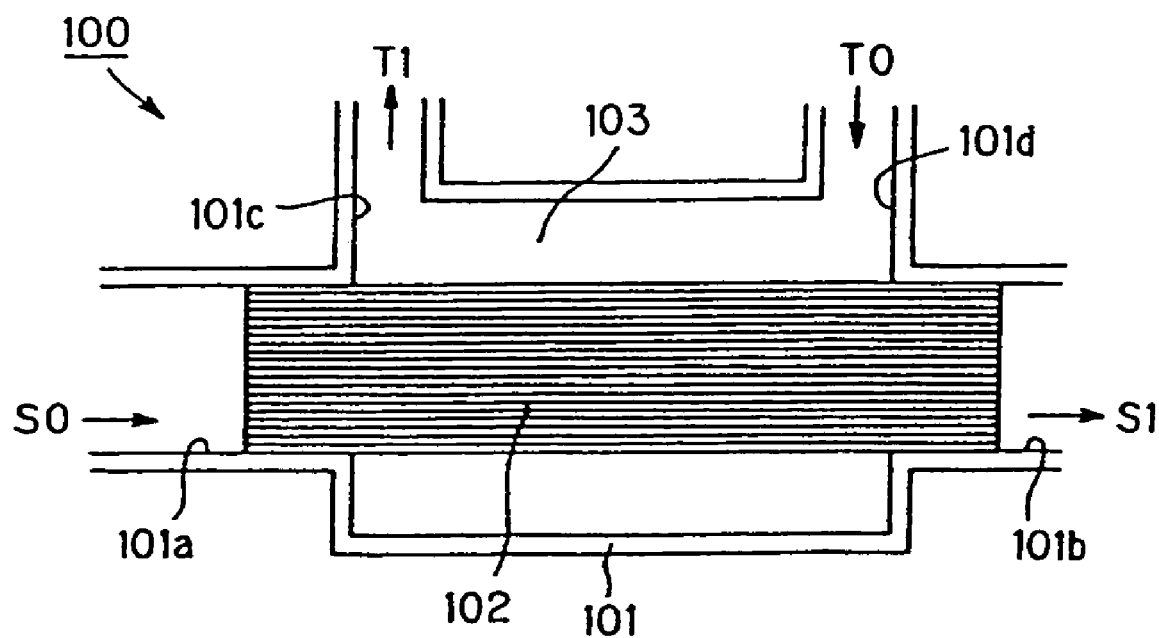
FIG. 5 is a schematically sectional view of a humidifier in the conventional art.

FIG. 4 is a schematically sectional view of the humidifier in accordance with the sixth example of the present invention.

As shown in this figure, in the humidifier 1b in accordance with this example, the clearance 34 is arranged between the outer circumferential face of the inner case 3 and the inner circumferential face of the sleeve-shaped hollow fiber membrane bundle 2. Accordingly, when water or a wet gas is flowed to the second path from the arrow T0 to the arrow T1, the water or the wet gas flowed out of the opening portion 31 is flowed to the clearance 34. Therefore, the water or the wet gas can be equally sent to the inner circumferential face of the hollow fiber membrane bundle 2.

Accordingly, each hollow fiber membrane 21 can be more effectively practically used so that humidifying efficiency can be raised.

INDUSTRIAL APPLICATION

As explained above, in the present invention, the second path is extended from the inside diameter side of the hollow fiber membrane bundle filled in the annular clearance to the outside diameter side. Accordingly, the hollow fiber membranes from the interior of the bundle to the exterior can be practically used so that humidifying efficiency can be improved.

If the first opening portion is arranged near one end of the hollow fiber membrane bundle and the second opening portion is arranged near the other end of the hollow fiber membrane bundle, the second path is extended from one end side of the hollow fiber membrane bundle to the other end side so that the hollow fiber membrane can be more effectively practically used.

If plural first opening portions are arranged in different positions with respect to the axial direction and the opening diameters of these opening portions are set to be gradually reduced toward the bottom of the inner case, the fluid can be flowed from each opening portion into the hollow fiber membrane bundle with good balance in the flowing case of the fluid toward the bottom within the sleeve of the inner case so that the hollow fiber membrane can be more effectively practically used.

The invention claimed is:

1. A humidifier for supplying gas after humidification to a fuel cell, said humidifier comprising:
   a sleeve-shaped inner case having a bottom;
   a sleeve-shaped outer case concentrically arranged with respect to the inner case; and
   a hollow fiber membrane bundle filled in an annular clearance between the outer case and the inner case;
   wherein the humidifier further comprises:
   a first path from one end side of said hollow fiber membrane bundle to the other end side through a hollow interior of each hollow fiber membrane; and
   a second path from an interior of said inner case to a second opening portion arranged on a sidewall of said outer case through a plurality of first opening portions arranged on a sidewall of said inner case and between outer wall faces of the respective hollow fiber membranes within the hollow fiber membrane bundle;
   said first opening portions being arranged in different positions with respect to an axial direction, and the opening diameters of the opening portions being set to be gradually reduced toward a bottom of the inner case; and a humidifying object gas flowing to one of said first and second paths, and a fluid including moisture flowing to the other.

2. A humidifier for supplying gas after humidification to a fuel cell, said humidifier comprising:

a sleeve-shaped inner case having a bottom;

a sleeve-shaped outer case concentrically arranged with respect to the inner case; and a hollow fiber membrane bundle filled in an annular clearance between the outer case and the inner case;

wherein the humidifier further comprises:

a first path from one end side of said hollow fiber membrane bundle to the other end side through a hollow interior of each hollow fiber membrane; and a second path from a first opening portion arranged on a sidewall of said inner case to a second opening portion arranged on a sidewall of said outer case through between outer wall faces of the respective hollow fiber membranes within the hollow fiber membrane bundle;

a humidifying object gas flowing to one of said first and second paths, and a fluid including moisture flowing to the other; and a clearance formed between a bottom face of a groove formed on an outer circumferential face of said inner case and an inner circumferential face of said hollow fiber membrane bundle.

* * * * *